(12) United States Patent
Fraas et al.

(10) Patent No.: US 7,196,263 B2
(45) Date of Patent: Mar. 27, 2007

(54) TPV CYLINDRICAL GENERATOR FOR HOME COGENERATION USING LOW NOX RADIANT TUBE BURNER

(75) Inventors: Lewis M. Fraas, Issaquah, WA (US); James E. Avery, Issaquah, WA (US)

(73) Assignee: JX Crystals Inc.

( * ) Notice: Subject to any disclaimer, the term of this patent is extended or adjusted under 35 U.S.C. 154(b) by 572 days.

(21) Appl. No.: 10/273,301

(22) Filed: Oct. 18, 2002

(65) Prior Publication Data

US 2003/0075214 A1 Apr. 24, 2003

Related U.S. Application Data

(60) Provisional application No. 60/329,761, filed on Oct. 18, 2001.

(51) Int. Cl.
*H01L 31/00* (2006.01)
(52) U.S. Cl. .................. 136/253; 136/244; 136/251
(58) Field of Classification Search ................ 136/253
See application file for complete search history.

(56) References Cited

U.S. PATENT DOCUMENTS

| 3,433,676 A | 3/1969 | Stein |
| 3,751,303 A | 8/1973 | Kittl |
| 3,929,510 A | 12/1975 | Kittl |
| 4,017,758 A | 4/1977 | Almer et al. |
| 4,045,246 A | 8/1977 | Mlavsky et al. |
| 4,069,812 A | 1/1978 | O'Neill |
| 4,131,485 A | 12/1978 | Meinel et al. |
| 4,180,414 A | 12/1979 | Diamond et al. |
| 4,234,352 A | 11/1980 | Swanson |
| 4,331,829 A | 5/1982 | Palazzetti et al. |

(Continued)

FOREIGN PATENT DOCUMENTS

| EP | 0 681 143 A2 * | 11/1995 |
| JP | 63-316486 | 12/1988 |

OTHER PUBLICATIONS

Howe et al; *The characteristics of atmospheric-type burners when used with natural gas*; Proc. of Semi-annual Meeting of ASME; Jul. 10, 1939; pp. 673-677.

(Continued)

*Primary Examiner*—Nam Nguyen
*Assistant Examiner*—Jeffrey Barton
(74) *Attorney, Agent, or Firm*—James Creighton Wray

(57) ABSTRACT

A cylindrical TPV generator uses low bandgap PV cells mounted on circuits in a polygonal array around an IR emitter. A low NOx radiant tube burner enables operation at low NOx. The combustion gases are completely contained within the radiant tube burner. A gap is provided between a recuperator and an inner flame tube of a dual tube SiC folded back recuperator assembly. Preheating combustion air in the recuperator allows for flameless oxidation. The gap allows for exhaust gas recirculation to complete combustion. The PV array is mounted inside a leak-tight envelope cooled on its outer surface by either water or air flow. Flanges on either end of this PV array container allow for hermetic seals. A folded back coaxial emitter support tube provides a long path length limiting thermal conduction along its cylindrical wall from the very hot emitter section to the cooled seal flange.

22 Claims, 4 Drawing Sheets

U.S. PATENT DOCUMENTS

| | | | |
|---|---|---|---|
| 4,707,560 | A | 11/1987 | Hottel et al. |
| 4,746,370 | A | 5/1988 | Woolf |
| 4,776,895 | A | 10/1988 | Goldstein |
| 4,906,178 | A | 3/1990 | Goldstein et al. |
| 4,976,606 | A | 12/1990 | Nelson |
| 5,044,939 | A | 9/1991 | Dehlsen |
| 5,080,724 | A | 1/1992 | Chubb |
| 5,091,018 | A | 2/1992 | Fraas et al. |
| 5,096,505 | A | 3/1992 | Fraas et al. |
| 5,118,361 | A | 6/1992 | Fraas et al. |
| 5,123,968 | A | 6/1992 | Fraas et al. |
| 5,217,539 | A | 6/1993 | Fraas et al. |
| 5,248,346 | A | 9/1993 | Fraas et al. |
| 5,255,666 | A | 10/1993 | Curchod |
| 5,312,521 | A | 5/1994 | Fraas et al. |
| 5,344,497 | A | 9/1994 | Fraas et al. |
| 5,356,487 | A | 10/1994 | Goldstein et al. |
| 5,383,976 | A | 1/1995 | Fraas et al. |
| 5,389,158 | A | 2/1995 | Fraas et al. |
| 5,401,329 | A | 3/1995 | Fraas et al. |
| 5,403,405 | A | 4/1995 | Fraas et al. |
| 5,439,532 | A | 8/1995 | Fraas |
| 5,505,789 | A | 4/1996 | Fraas et al. |
| 5,512,109 | A | 4/1996 | Fraas et al. |
| 5,551,992 | A | 9/1996 | Fraas |
| 5,560,783 | A | 10/1996 | Hamlen |
| 5,601,661 | A | 2/1997 | Milstein et al. |
| 5,616,186 | A | 4/1997 | Fraas et al. |
| 5,651,838 | A | 7/1997 | Fraas et al. |
| 5,865,906 | A | 2/1999 | Ferguson et al. |
| 5,942,047 | A | 8/1999 | Fraas et al. |
| 6,037,536 | A | 3/2000 | Fraas |
| 6,091,018 | A | 7/2000 | Fraas et al. |
| 6,177,628 | B1 | 1/2001 | Fraas et al. |
| 6,198,038 | B1 | 3/2001 | Shukla et al. |
| 6,218,607 | B1 | 4/2001 | Mulligan et al. |
| 6,232,545 | B1 | 5/2001 | Samaras et al. |
| 6,235,983 | B1 | 5/2001 | Becker et al. |
| 6,271,461 | B1 | 8/2001 | Fraas et al. |
| 6,489,553 | B1 * | 12/2002 | Fraas et al. ............... 136/253 |

OTHER PUBLICATIONS

Kittl et al.; *Design analysis of TPV-generator system*; Proceedings of 25th Annual Meeting of Power Sources Conference; May 1972; pp. 106-110.

Tester et al.; *Comparative performance characteristics of cylindrical, parabolic, and flat plate solar energy colectors*; Presentation at annual winter meeting of ASME, Nov. 17-22, 1974; 12 pages.

Fraas et al.; *Concentrated and piped sunlight for indoor illumination*; Applied Optics, vol. 2, No. 4; Feb. 15, 1983; pp. 578-582.

Höffler et al.; *Selective emitters for thermophotovoltaic solar energy conversion*; Solar Cells, vol. 10; 1983; pp. 257-271, month N/A.

Lampert, Carl M.; *Heat mirror coatings for energy conserving windows*; Solar Energy Materials; vol. 6; 1981; pp. 1-41, month N/A.

Höfler et al.; *Interference filters for thermophotovoltaic solar energy conversion*; Solar Cells, vol. 10; 1983; pp. 273-286, month N/A.

Höfler et al.; *Selective absorbers and interference filters for thermophotovoltaic energy conversion*; Proceedings of 5th Photovoltaic Energy Conference, Athens, Greece; Oct. 1983; pp. 225-229.

O'Neill, Mark J.; *Development of a Fresnel lens gallium arsenide photovoltaic concentrator for space applications*; Final Technical Report NASA Contract NAS3-24871; Sep. 1986.

Pelka et al.; *Natural gas fired thermophotovoltaic system*; Proceedings of the 32nd International Power Sources Conference, Cherry Hill, NJ; Jun. 1986; pp. 110-123.

Woolf, L. D.; *Optimum efficiency of single and multiple bandgap cells in thermophotovoltaic energy conversion*; Solar Cells, vol. 19; 1986-1987; pp. 19-31, month N/A.

Todorof, Bill; *A 450 suns concentrator module design*; Conference Record, 20th IEEE Photovoltaic Specialists conference, Las Vegas, NV; Sep. 1988; pp. 1347-1352.

Morgan et al.; *Radioisotope thermalphotovoltaic application of the GaSb solar cell*; Proceedings of NASA Sprat Conference, Cleveland, OH; Nov. 7-9, 1989; pp. 349-358.

Chubb, Donald L.; *Reappraisal of solid selective emitters*; Proceedings of 21st IEEE Photovoltaic Specialists Conference, Kissimmee, FL; May 1990; pp. 1326-1333.

Day et al.; *Application of the GaSb solar cell in isotope-heated power systems*; Proceedings of 21st IEEE Photovoltaic Specialists Conference, Kissimmee, FL; May 1990; pp. 1320-1325.

Piszczor et al.; *The mini-dome fresnel lens photovoltaic concentrator array; current status of component & prototype panel testing*; Proceedings of 21st IEEE Photovoltaic Specialists Conference, Kissimmee, FL; May 1990; pp. 1271-1276.

Kuryla et al.; *22.7 %efficient 1000X GaAs concentrator module*; Proceedings of 21st IEEE Photovoltaic Specialists Conference, Kissimmee, Fl; May 1990; pp. 1142-1146.

Fraas et al.; *Over 30 %efficient tandem Gallium solar cells for use with concentrated sunlight*; OPTOELECTRONICS, vol. 5, No. 2; Dec. 1990; pp. 297-310.

Doellner, Oscar L.; *Aircraft photovoltaic power-generating system*; Appendix A of Doctoral dissertation, Univ. of Arizona; 1991; p. 154, month N/A.

Fraas et al.; *Advanced photovoltaic power systems using tandem GaAs/GaSb concentrator modules*; Proceedings of 3rd Annual Symp. of univ. Ariz/NASA Space Eng. Res. Center for Utilization of Local Planetary Resources; F1b. 20-22, 1992; pp. II-9-II-21.

Fraas, Lewis M.; *JX Crystals Inc.Presentation to NREL Enterprise Growth Forum*; Oct. 25, 1995; pp. 1-18 Whitaker, Tim; *GaSb shines brighter than midnght sun*; Tech. Update: Fall 1998, month N/A.

\* cited by examiner

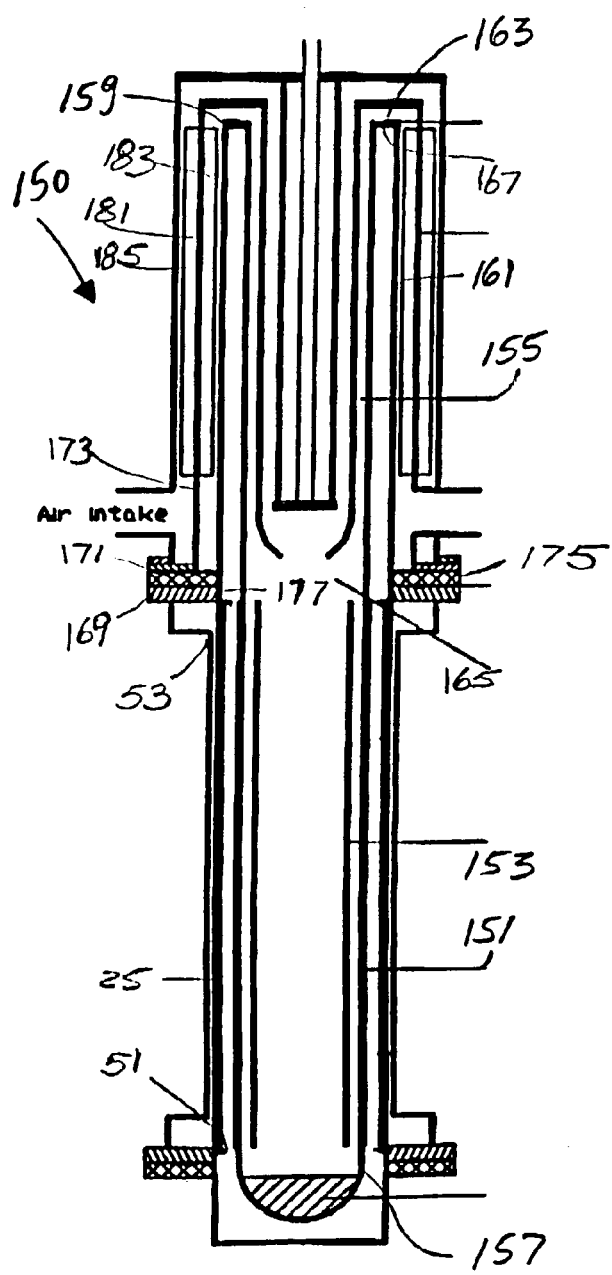
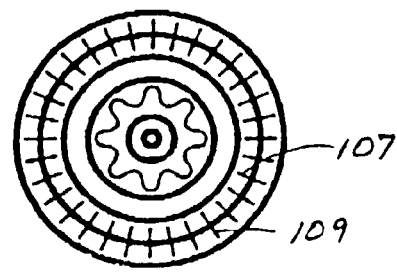
FIG. 5
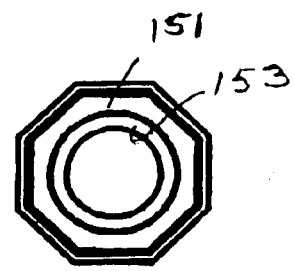
FIG. 4
FIG. 3

TPV CYLINDRICAL GENERATOR FOR HOME COGENERATION USING LOW NOx RADIANT TUBE BURNER

This application claims the benefit of U.S. Provisional Application No. 60/329,761, filed Oct. 18, 2001.

BACKGROUND OF THE INVENTION

A cylindrical ThermoPhotoVoltaic (TPV) generator may use combustion to heat a cylindrical tube to a temperature in the range of 1200° C. to 1500° C. as we have previously described. This glowing tube then emits infrared radiant energy. An array of low bandgap photovoltaic (PV) cells surrounds this glowing emitter, receives the infrared radiant energy, and converts it to electricity. This cylindrical TPV generator was also equipped with a recuperator used to recycle heat from the combustion exhaust stream back into the combustion air for a higher efficiency TPV generator. These cylindrical TPV generators can potentially be used to generate heat and power for the home with 90% fuel utilization efficiency.

We have described an AntiReflection coated Refractory Metal (AR/RM) IR emitter designed to emit infrared energy primarily in a wavelength band that the PV cells can convert. However, many of these AR/RM emitters cannot be operated in air because of oxidation of the refractory metal. In our specific TPV systems, we use GaSb PV cells that respond to IR wavelengths out to 1.8 microns and AR coated tungsten foil as the key emitter and receiver components. We have noted that various other material combinations are possible as long as they operate in this IR wavelength range.

SUMMARY OF THE INVENTION

In a co-pending application U.S. Ser. No. 09/866,649, which is incorporated herein by reference in its entirety, we have described an improved cylindrical TPV generator with a hermetic seal that allows the AR/RM emitter to operate in a non-oxidizing inert gas atmosphere. This hermetic seal minimizes heat transfer from the very hot emitter support tube to the hermetic seal.

The FIG. 1 embodiment is quite functional. However, all of the parts in this construction are custom. This is not a problem for the key components, i.e. GaSb cells and circuits, AR/RM emitter, and IR filter because JX Crystals fabricates these parts internally. However, the burner parts are also custom and the high temperature parts, in particular the SiC and Kanthal parts, are expensive and difficult to obtain in small quantities.

There are industrial size low NOx recuperative radiant tube burners that use SiC and Kanthal parts and that are manufactured in high volume. A typical design for these industrial radiant tube burners is shown in FIG. 2. Our FIG. 1 embodiment is modified to allow the use of these high temperature burner and recuperator components that are now in volume production.

Our cylindrical TPV generator shown in FIG. 3 uses low bandgap PV cells mounted on circuits in a polygonal array around an IR emitter. The IR emitter is located on the outside surface of the hot end of a radiant tube burner coaxial with the PV array. The combustion gases are completely contained within the radiant tube burner. The PV array is mounted inside a leak-tight envelope cooled on its outer surface by either water or air flow. Flanges on either end of this PV array container allow for hermetic seals.

It is desirable for a home TPV generator to operate with low NOx. However, high NOx can be a problem for a high temperature burner. A solution to this NOx problem is incorporated today in industrial radiant tube burners. This solution is to leave a gap between the recuperator and the inner flame tube and to operate with a fuel and air mixture close to the stoichiometric mixture. Operating close to the stoichiometric mixture de-localizes the flame so that combustion occurs at a lower temperature in a larger volume. In fact, because combustion air is preheated in the recuperator, combustion can be flameless. The gap between the two inner SiC sections allows for exhaust gas re-circulation to complete combustion. We also incorporate this feature in our cylindrical TPV generator for low NOx.

These and further and other objects and features of the invention are apparent in the disclosure, which includes the above and ongoing written specification, with the claims and the drawings.

BRIEF DESCRIPTION OF THE DRAWINGS

FIG. 3 shows a vertical cross section through our improved TPV generator concept integrating the SiC parts from a recuperative radiant tube burner into our TPV generator including the key features labeled in FIG. 1.

FIG. 4 shows a horizontal cross section through the TPV converter section of our improved TPV generator. The polygonal water-cooled PV array surrounds the AR/RM emitter coaxial with the SiC outer tube and the SiC inner flame tube.

FIG. 5 shows a horizontal cross section through the coaxial recuperator section of our improved cylindrical TPV generator.

DETAILED DESCRIPTION OF THE PREFERRED EMBODIMENT

Figure 1:
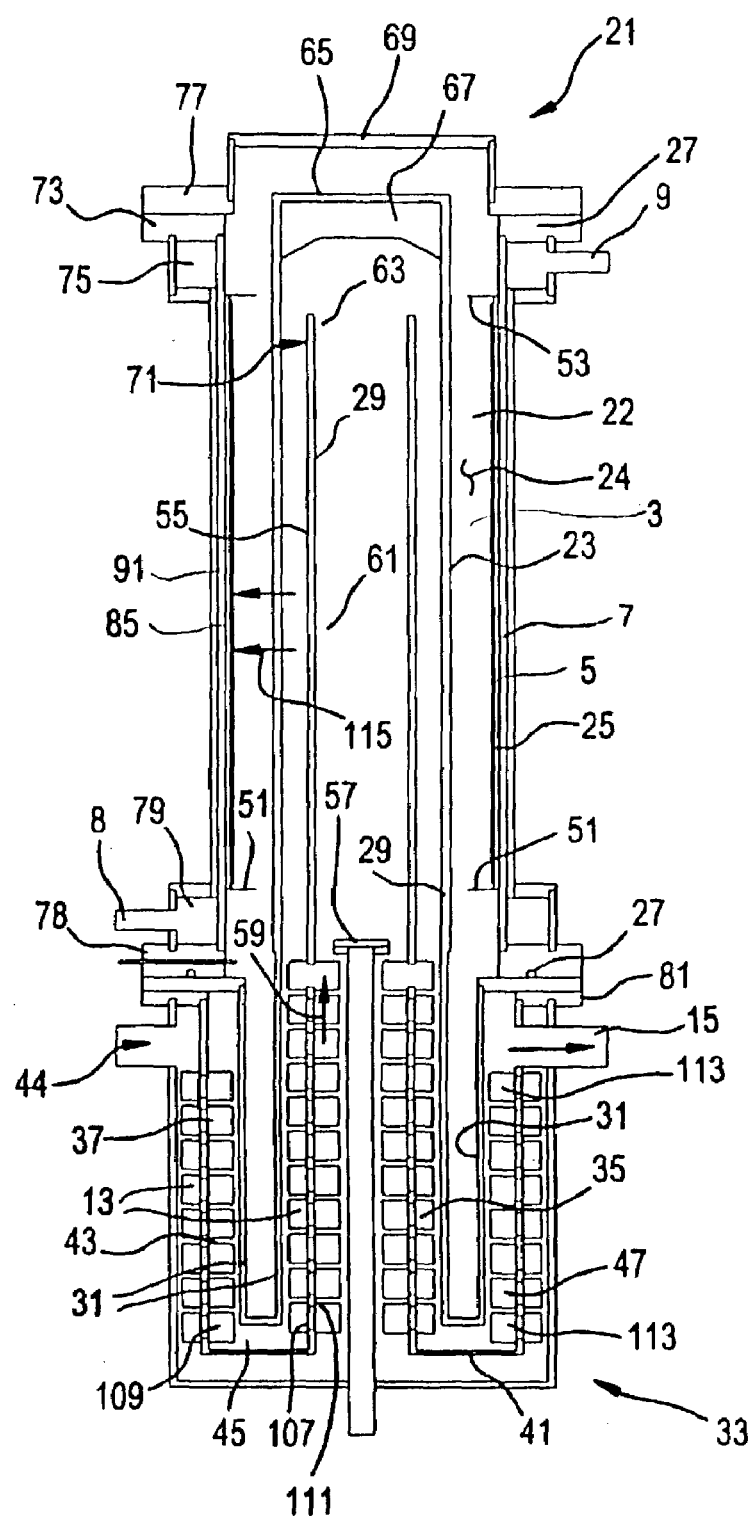
FIG. 1 shows the vertical cross section through the basic cylindrical TPV generator concept as described in our co-pending patent application with key features labeled.

FIG. 1 shows the TPV generator concept that we described in a co-pending patent application, which is incorporated herein by reference in its entirety. This application describes a modification in which a TPV generator replaces the heating furnace in the home and provides both heat and electricity for the home. Specifically, the inventive TPV generator generates for example, but not limited to, 1.5 kW of electricity with a fuel burn rate of, for example, approximately 40 thousand BTUs per hour.

FIG. 1 shows the embodiment described in our co-pending application. This embodiment includes, but is not limited to, the following key features:

(A) Inert gas between IR AR/RM emitter and PV cell array.
(B) Hermetic seal between IR emitter support tube and PV cell array.
(C) Fold back coaxial emitter support tube within recuperator.
(D) Dual coaxial recuperator
(E) End mirrors for IR confinement.

(F) Tapered inner burner tube to tailor emitter temperature uniformity.

(G) Perforated turn around plate for after-burn air supply.

(H) Catalytic coating on outer disk column for clean after-burn.

Items (A) through (E) are preserved in the modification of the FIG. 1 embodiment to be described herein. However, modifications are made in items (F), (G) and (H). Items (G) and (H) relate to low NOx and this is obtained in an alternate way as set forth herein.

FIG. 1 shows the cylindrical TPV generator concept with the key components labeled. The TPV conversion efficiency of this cylindrical generator 1 is improved dramatically by using an AR/RM emitter 3. In a preferred embodiment, the AR/RM emitter can be an AR coated tungsten foil wrapped around an emitter support tube. A photovoltaic (PV) cell array assembly 5 surrounds the emitter 3. A water cooling jacket 7 is provided outside the array assembly 5. The jacket has an inlet 8 and an outlet 9. A combustion air blower 11 supplies combustion air through a recuperator 13. Hot combustion exhaust gases exit through exhaust 15. Provisions are also required for a low NOx efficient burner/recuperator assembly. Finally, provisions are required for high IR to electric conversion efficiency.

FIG. 1 shows a vertical cross section through our cylindrical TPV generator 21. The IR emitter 23 is an AR/RM emitter. With the AR/RM emitter, several improvements are highlighted in capital letters in FIG. 1. These improvements include: inert gas 24 between IR AR/RM emitter 23 and PV cell array 25; hermetic seal 27 between IR emitter support tube 31 and PV cell array 25; fold back coaxial emitter support tube 31 within recuperator 33; dual disk stack recuperator 33 with inner disk stack 35 and outer disk stack 37; perforated turn around plate 41 for after-burn 43 air supply 45; catalytic coating 47 on outer disk stack 37 for clean after-burn; end mirrors 51, 53 for IR confinement; and tapered inner burner tube 55 to tailor emitter temperature uniformity.

The AR/RM emitter 23 produces a major improvement in system efficiency because it suppresses long wavelength IR energy that the cells cannot convert. However, this leads to a requirement for inert gas 24 between the AR/RM emitter 23 and the PV array 25.

A burner 57 supplies fuel to preheated air 59. Combustion 61 occurs within the burner or combustion tube 55. Hot combustion gases 63 flow upward and are turned downward by the top 65 with insulation 67 within cap 69. The upper end 71 of combustion tube 55 is spaced inward from the emitter 23 too, because of the higher heat at the upper end.

A flange 73 extends outward from the water gallery 75 at the outlet 9. Flange 73 is sealed to flange 77 of cap 69. Flange 78 at the inlet water gallery 79 is hermetically sealed 27 to the flange 81 between the emitter support tube 31 and the PV cell array 25.

TPV generator 21 uses low bandgap PV cells 83 mounted on circuits 85 in a polygonal array around an IR emitter. The IR emitter is located on the outside surface of a radiant tube burner coaxial with the PV array. The combustion gases are completely contained within the radiant tube burner 29. The PV array is mounted inside a leak tight envelope 89 cooled on its outer surface by water in channels 91. Flanges 73, 78 on either end of this PV array container allow for hermetic seals 27. The flange 78 on one end of this PV container 89 seals to a flange 81 on the end of the emitter support tube 31. This seal allows the space 22 between the emitter and the PV array to be back-filled with an inert gas 24.

The radiant burner tube 29 is elongated extending into the recuperator section 33 and then folded back, exiting the recuperator with a slightly larger coaxial tube 31 connecting to a flange 81 sealing 27 to the flange 78 of the Photovoltaic Converter Array (PCA) 25. This avoids overheating the hermetic seal flange. This folded back coaxial emitter support tube 31 provides a long path length limiting thermal conduction along its cylindrical wall from the very hot emitter section 23 to the cooled seal flange.

The folded back emitter support tube 31 blends nicely with a two stage folded back recuperator assembly 33 consisting of two sets 35, 37 of finned disks 107, 109. A stack 35 of smaller finned disks 107 is located inside the radiant burner tube extension and a second stack 37 of larger finned disks 109 is located outside the fold back section 31. The stack is made up of finned disks 107 and rings 111 simply pressed together to make the stack.

The preferred dual disk stack device has several advantages. First, it is very compact being much shorter in length than a single disk stack. Second, it is more efficient than a single disk stack, because the hottest section 35 is inside cooler sections 37. In a single disk stack, the outer section is the hottest. The third advantage is somewhat subtle. This allows for a low NOx burner/recuperator assembly.

It is desirable for a home TPV generator to operate with low NOx. However, high NOx can be a problem for a high temperature burner. A solution to this NOx problem is to burn the fuel at high temperature with no excess oxygen so that little NOx is generated. However, this fuel-rich burn leaves CO and hydrocarbons. These can be eliminated in a low temperature after-burn with a catalyst inside the recuperator section.

In the cylindrical TPV generator as shown in FIG. 1, we provide for a low temperature catalytic after-burn by providing a perforated turnaround plate 41 coupling between the inner disk stack 35 and the outer disk stack 37. This perforated turnaround plate 41 provides a small amount 45 of combustion air 44 for the after-burn. A catalyst coating 47 can be provided on the hotter surface 113 of the outer finned disks 109. The after-burn occurs in the outer finned disk stack 37.

Additional features are incorporated in our cylindrical TPV generator to provide for high conversion efficiency. Mirrors 51, 53 are located at the ends of the PV array 25 to confine the IR energy 115 between the emitter 23 and the array 25. Also, the inner burner tube 55 within the emitter support tube 29 can be tapered in order to optimize the emitter temperature profile along the length of the emitter. Both of these provisions provide for uniform illumination of the cells 83 so that all of the cells in a series string along a circuit 85 generate approximately the same current.

The FIG. 1 embodiment is quite functional. However, all of the parts in this construction are custom. This is not a problem for the key components, i.e. GaSb cells and circuits, AR/RM emitter, and IR filter because JX Crystals fabricates these parts internally. However, the burner parts are also custom and the high temperature parts, in particular the SiC and Kanthal parts, are expensive and difficult to obtain in small quantities.

Figure 2:
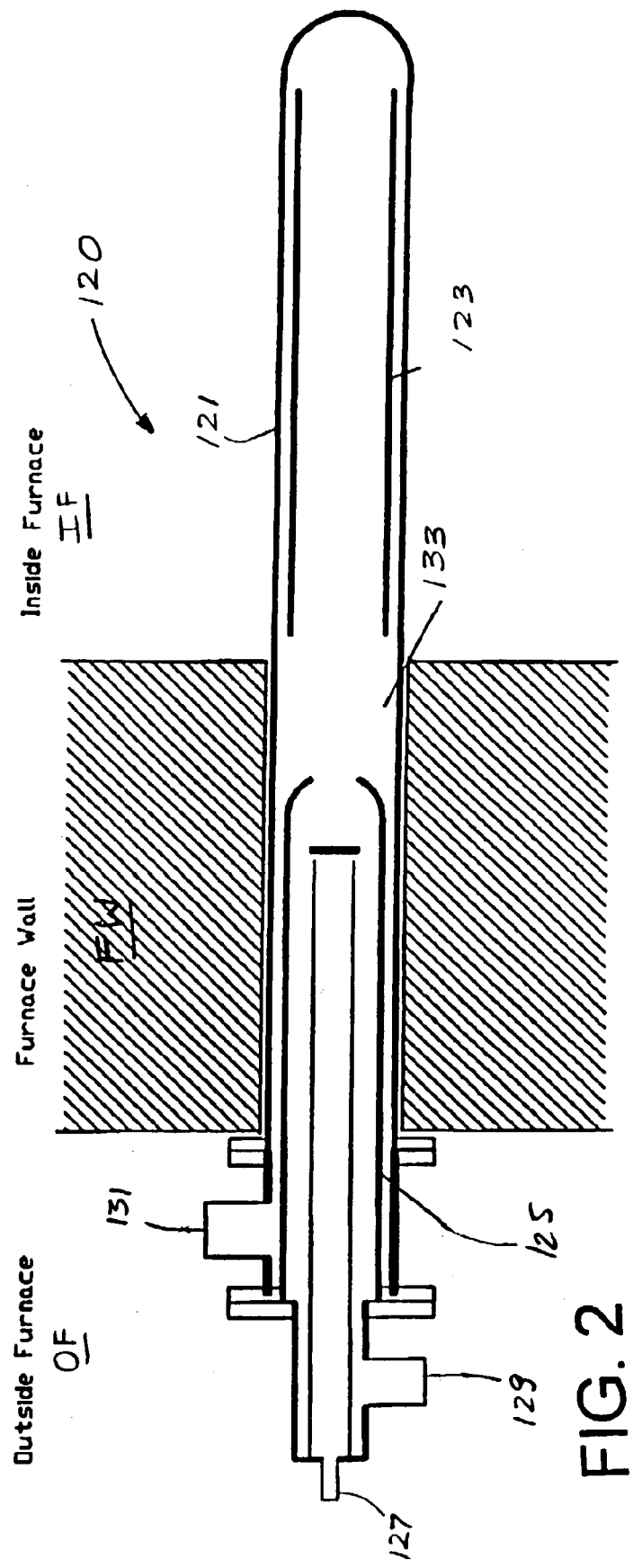
FIG. 2 shows a vertical cross section through an industrial low NOx SiC recuperative radiant tube burner. The SiC outer tube, SiC flame tube, and SiC recuperator tube are labeled.
Figure 6:
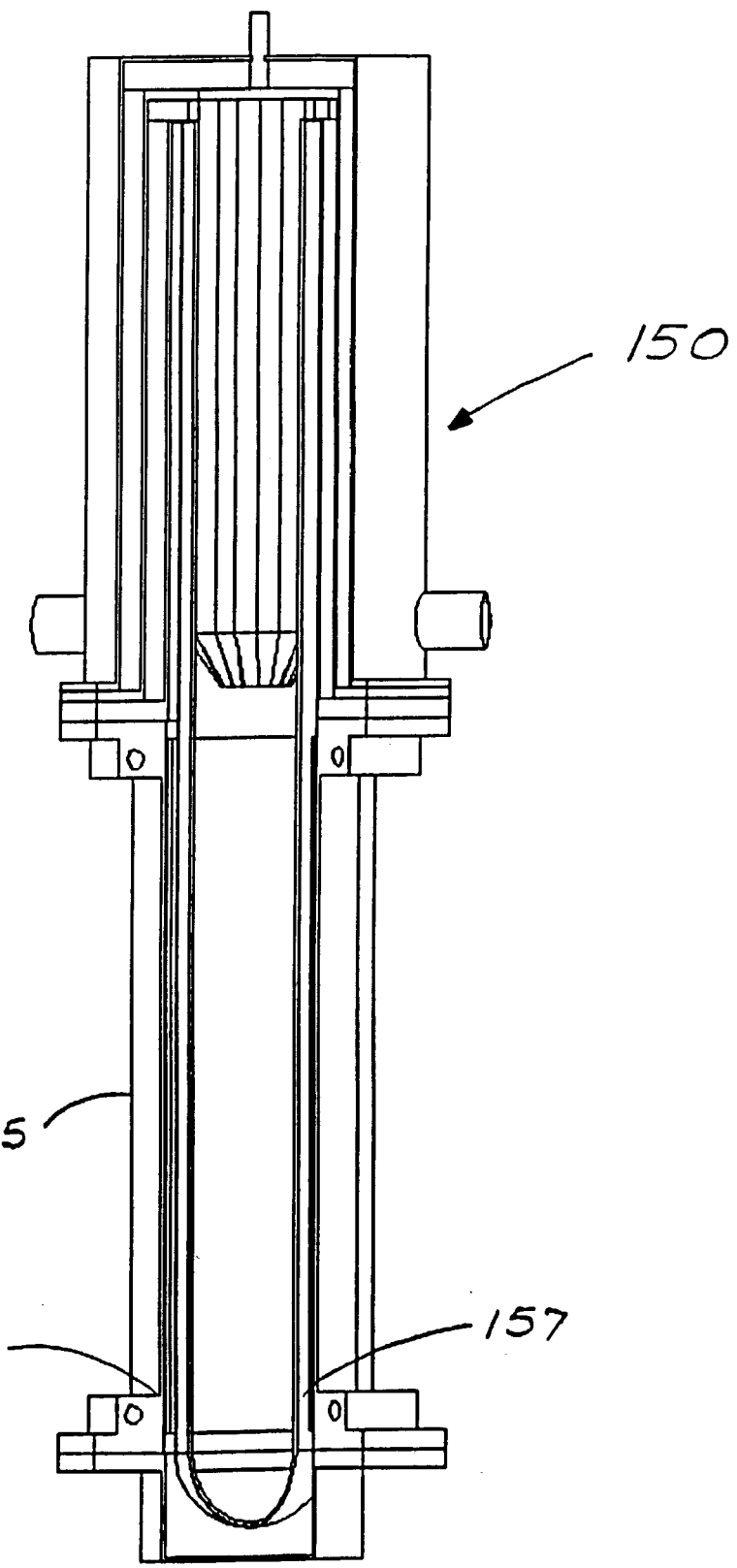
FIG. 6 is a three-dimensional view with a cut-out through the improved TPV generator.

There are industrial size low NOx recuperative radiant tube burners that use SiC and Kanthal parts and that are manufactured in high volume. A typical design for these industrial radiant tube burners is shown in FIG. 2. FIG. 2 shows a vertical cross section through an industrial low NOx SiC recuperative radiant tube burner 120. The SiC outer tube 121, SiC flame tube 123, and SiC recuperator tube 125 are labeled on FIG. 2. The tube burner 120 is shown connecting the outside of the furnace OF to the furnace inside IF through furnace wall W. The tube 120 has a fuel intake 127, air intake 129, and exhaust 131. The tube includes the gap 133 within the tube.

The FIG. 1 embodiment is modified to allow the use of these high temperature burner and recuperator components that are now in volume production. Thus, in the modified embodiment relating to FIGS. 1 and 2, the emitter support tube, tapered burner tube, and inner finned disc recuperator in FIG. 1 is replaced by the SiC outer tube 121, inner SiC flame tube 123, and SiC recuperator 125 shown in FIG. 2, respectively. The resultant modified cylindrical TPV generator is shown in FIGS. 3, 4, 5, and 6.

Listed previously are some of the key features in the embodiment in FIG. 1. The following list includes, but is not limited to, some of the key features in the FIG. 3 embodiment:

(A) Inert gas between IR AR/RM emitter and PV cell array.
(B) Hermetic seal between IR emitter support tube and PV cell array.
(C) Fold back coaxial emitter support tube within recuperator.
(D) Dual coaxial recuperator
(E) End mirrors for IR confinement.
(F) Tapered inner flame tube to tailor emitter temperature uniformity.
(G) Gap between inner flame tube and high temperature recuperator for exhaust gas re-circulation for low NOx
(H) Insulation inside rounded end of emitter support tube.

Above features (A) through (E) are unchanged from FIG. 1. Referring to feature (F), the flame tube in the radiant tube burner is not normally tapered for the industrial furnace application. However, for preferred TPV systems, temperature uniformity being more important, a tapered flame tube allows for uniformity to be optimized.

FIG. 3 shows a vertical cross section through our improved TPV generator 150, integrating the SiC parts from the recuperative radiant tube burner shown in FIG. 2 into our TPV generator, and including the features of FIG. 1. Referring to FIGS. 1–3, the generator 150 in FIG. 3 is upside down relative to the one in FIG. 1. This accommodates the gap 165 between the inner SiC flame tube 123, 153 and the SiC recuperator 125, 155. This gap 165 is a significant difference between FIG. 1 and FIG. 3.

A typical recuperative radiant tube burner 150, as seen in FIGS. 3–6, contains three high temperature elements. There is the first and largest diameter outer SiC tube 151 closed at its hot end 157, with a second inner SiC flame tube 153 inside it at its hot end 157 and a third SiC recuperator tube assembly 155 inside the first outer tube and located toward the cold end 159. Our device uses all three of these SiC parts. However, instead of mounting a flange on the open end of the largest SiC tube, this SiC tube 151 is bonded 167 to a larger diameter coaxial SiC or metal tube 161 that folds back 163 toward the hot end of the SiC tube 151 and terminates with a flange 171.

The flange 169 on one end of the PV container 173 seals 175 to the flange 171 on the end 177 of this coaxial emitter support tube 161. This seal 175 allows the space between the emitter and the PV array to be back-filled with an inert gas. This folded back coaxial emitter support tube 161 provides a long path length limiting thermal conduction along its cylindrical wall from the very hot emitter section to the cooled seal flange.

The folded back emitter support tube 161 blends nicely with a two stage folded back recuperator assembly 181 consisting of two coaxial recuperator sections 183, 185. A stack of large finned disks is located outside the emitter support tube and the standard SiC recuperator tube assembly is located inside the fold back section of the first SiC tube. This dual coaxial recuperator has several advantages. First, it is very compact being half the length relative to a single diameter equivalent recuperator. Second, it is more efficient than a single diameter recuperator because the hottest section is inside cooler sections.

Additional features are incorporated in our cylindrical TPV generator to provide for high conversion efficiency. Mirrors 51, 53 are located at the ends of the PV array 25 to confine the IR energy between the emitter 151 and the array 25. Also, the inner burner tube within the emitter support tube can be tapered in order to optimize the emitter temperature profile along the length of the emitter. Both of these provisions provide for uniform illumination of the cells so that all of the cells in a series string generate approximately the same current.

Feature (G) relates to low NOx. It is desirable for a home TPV generator to operate with low NOx. However, high NOx can be a problem for a high temperature burner. A solution to this NOx problem is incorporated in industrial radiant tube burners. This solution is to leave a gap between the recuperator and the inner flame tube and to operate with a fuel and air mixture close to the stoichiometric mixture. Operating close to the stoichiometric mixture de-localizes the flame so that combustion occurs at a lower temperature in a larger volume. In fact, because combustion air is preheated in the recuperator, combustion can be flameless. This mode is referred to as flameless oxidation or FLOX mode. The gap between the two inner SiC sections allows for exhaust gas re-circulation to complete combustion. We also incorporate this feature in our cylindrical TPV generator for low NOx.

Feature (H) represents a significant difference between FIG. 2 compared to FIGS. 1 and 3. In a TPV generator, we couple IR radiation to the PV array. This prevents heat loss at the end of the radiant tube burner. This requirement also leads to the use of heat shields or insulation (not shown) around the outer SiC tube everywhere except where the AR/RM emitter foil is located.

While the invention has been described with reference to specific embodiments, modifications and variations of the invention may be constructed without departing from the scope of the invention, which is defined in the following claims.

We claim:

1. A thermophotovoltaic generator comprising a burner, a combustion air guide leading to the burner, a radiant tube burner extending upwards around the burner, an infrared emitter spaced outward from the tube burner, a photovoltaic cell array spaced outward from the emitter, an exhaust guide connected to the generator for exhausting combustion gases, a recuperator connected to the combustion air guide and to the exhaust guide for preheating combustion air with exhaust gases, a gap between the recuperator and an inner flame tube and a fold-back emitter support tube extending along the recuperator, wherein the gap allows for exhaust gas re-circulation to complete combustion and operation at close to a stoichiometric mixture of fuel and air de-localizing a burner flame so that combustion occurs at a lower temperature and NOx is low.

2. The generator of claim 1, further comprising inert gas disposed between the emitter and the photovoltaic cell array.

3. The generator of claim 2, further comprising a hermetic seal between the support tube and the array for sealing the inert gas between the support tube and the array.

4. The generator of claim 1, further comprising end mirrors at opposite ends of the array for reflecting infrared rays toward the array.

5. The generator of claim 1, wherein the recuperator comprises fins extending into the combustion air guide and into the exhaust guide, the recuperator farther comprising dual coaxial recuperator assembly.

6. The generator of claim 5, wherein the coaxial recuperator elements are formed of an inner stack and an outer stack.

7. The generator of claim 6, wherein each stack is formed of disks having inward and outward extending fins and rings interconnecting the disks.

8. A thermophotovoltaic generator comprising a burner, a combustion air guide leading to the burner, a radiant tube burner extending from around the burner, an infrared emitter spaced outward from and surrounding the tube burner, a photovoltaic cell array spaced outward from the emitter, an exhaust guide connected to the generator for exhausting combustion gases, a gap between a recuperator and an inner flame tube, wherein the gap allows for exhaust gas re-circulation to complete combustion and operation at close to a stoichiometric mixture of fuel and air, de-localizing a burner flame so that combustion occurs at a lower temperature and NOx is low, and inert gas disposed between the emitter and the photovoltaic cell array.

9. The generator of claim 8, further comprising a hermetic seal between the support tube and the array for sealing the inert gas between the support tube and the array.

10. The generator of claim 8, further comprising end mirrors at opposite ends of the array for reflecting infrared rays toward the array.

11. The generator of claim 8, wherein the tube burner comprises a tapered burner tube for controlling spacing between the tapered burner tube and the emitter.

12. A thermophotovoltaic generator comprising a burner, a combustion air guide leading to the burner, a radiant tube burner extending from the around the burner, an infrared emitter spaced outward from the tube burner, a photovoltaic cell array spaced outward from the emitter, an exhaust guide connected to the generator for exhausting combustion gases, a gap between a recuperator and an inner flame tube, wherein the gap allows for exhaust gas re-circulation to complete combustion and operation at close to a stoichiometric mixture of fuel and air, de-localizing a burner flame so that combustion occurs at a lower temperature and NOx is low, and end mirrors at opposite ends of the array for reflecting infrared rays toward the array.

13. The generator of claim 12, wherein the tube burner comprises a tapered burner tube for controlling spacing between the tapered burner tube and the emitter.

14. A thermophotovoltaic generator comprising a burner, a combustion air guide leading to the burner, a radiant burner tube extending from the around the burner, an infrared emitter spaced outward from the tube burner, a photovoltaic cell array spaced outward from and surrounding the emitter, an exhaust guide connected to the generator for exhausting combustion gases, a gap between a recuperator and an inner flame tube, wherein the gap allows for exhaust gas re-circulation to complete combustion and operation at close to a stoichiometric mixture of fuel and air, de-localizing a burner flame so that combustion occurs at a lower temperature nd NOx is low, and wherein the burner tube comprises a tapered burner tube for controlling spacing between the tapered burner tube and the emitter.

15. A thermophotovoltaic generator comprising a burner, a combustion air guide leading to the burner, a radiant tube burner extending around the burner, an infrared emitter spaced outward from and surrounding the tube burner, a photovoltaic cell array spaced outward from the emitter, an exhaust guide connected to the generator for exhausting combustion gases, a gap between a recuperator and an inner flame tube, wherein the gap allows for exhaust gas re-circulation to complete combustion and operation at close to a stoichiometric mixture of fuel and air, de-localizing a burner flame so that combustion occurs at a lower temperature and NOx is low, a fold back emitter support tube having an inner portion connected to the emitter having a middle portion extending away from the emitter then outward and then in the direction of the emitter and then outward for connecting to an enclosure for reducing conduction heat flow from the emitter along the emitter support tube to the enclosure.

16. The generator of claim 15, further comprising inert gas disposed between the emitter and the photovoltaic cell array.

17. The generator of claim 16, further comprising a hermetic seal between the support tube and the array for sealing the inert gas between the support tube and the array.

18. The generator of claim 15, further comprising end mirrors at opposite ends of the array for reflecting infrared rays toward the array.

19. The generator of claim 15, wherein the tube burner comprises a tapered burner tube for controlling spacing between the tapered burner tube and the emitter.

20. The generator of claim 15, wherein the recuperator has coaxial elements with an inner stack positioned inside the middle portion and has an outer stack positioned outside the middle portion.

21. The generator of claim 20, wherein the middle portion of the emitter support tube and the recuperator turnaround plate form the exhaust guide and further comprising a porous portion of the turnaround plate for leaking combustion air into the exhaust guide.

22. The generator of claim 21, wherein the recuperator comprises fins extending in to the combustion air guide and into the exhaust guide, and further comprising catalyst coatings on at least some of the fins extending into the exhaust guide and cooperating with leaked combustion air for completing combustion of the exhaust gases.

* * * * *